(12) United States Patent
Cortial et al.

(10) Patent No.: US 11,359,971 B2
(45) Date of Patent: Jun. 14, 2022

(54) DETECTOR OF ELECTROMAGNETIC RADIATION AND IN PARTICULAR INFRARED RADIATION, AND PROCESS FOR PRODUCING SAID DETECTOR

(71) Applicants: COMMISSARIAT A L'ENERGIE ATOMIQUE ET AUX ENERGIES ALTERNATIVES, Paris (FR); ULIS, Veurey Voroize (FR)

(72) Inventors: Sébastien Cortial, Sassenage (FR); Marc Guillaumont, Grenoble (FR); Denis Pelenc, Quaix en Chartreuse (FR); Xavier Zucchi, Vaulnaveys-le-Haut (FR)

(73) Assignees: COMMISSARIAT A L'ENERGIE ATOMIQUE ET AUX ENERGIES ALTERNATIVES, Paris (FR); ULIS, Veurey Voroize (FR)

( * ) Notice: Subject to any disclaimer, the term of this patent is extended or adjusted under 35 U.S.C. 154(b) by 0 days.

(21) Appl. No.: 16/468,537

(22) PCT Filed: Dec. 29, 2017

(86) PCT No.: PCT/EP2017/084824
§ 371 (c)(1),
(2) Date: Jun. 11, 2019

(87) PCT Pub. No.: WO2018/122382
PCT Pub. Date: Jul. 5, 2018

(65) Prior Publication Data
US 2020/0088585 A1    Mar. 19, 2020

(30) Foreign Application Priority Data
Dec. 30, 2016    (FR) ........................... 1663552

(51) Int. Cl.
*G01J 5/20*    (2006.01)
*G01J 5/04*    (2006.01)
*G01N 21/3504*    (2014.01)

(52) U.S. Cl.
CPC ............... *G01J 5/045* (2013.01); *G01J 5/20* (2013.01); *G01N 21/3504* (2013.01)

(58) Field of Classification Search
CPC ........ G01J 5/045; G01J 5/20; G01N 21/3504; H01L 23/26; H01L 37/00;
(Continued)

(56) References Cited

U.S. PATENT DOCUMENTS 5,450,053 A    9/1995    Wood
5,900,799 A *    5/1999    Morris ................. G01K 17/003
                                         338/15

(Continued)

FOREIGN PATENT DOCUMENTS

EP            2264765 A1    12/2010
WO    WO-2009/131674 A2    10/2009
WO    WO-2016/009126 A1    1/2016

OTHER PUBLICATIONS

Elbner et al. "Reliability of microbolometer thermal imager sensors using chip-scale packing", Elsevier Ltd, Procedia Engineering 120 (2015), p. 1191-1196 (Year: 2015).*

(Continued)

*Primary Examiner* — David P Porta
*Assistant Examiner* — Mamadou Faye
(74) *Attorney, Agent, or Firm* — Marshall, Gerstein & Borun LLP

(57) ABSTRACT

An infrared radiation detector includes an array of elementary imaging bolometric detectors, each of the elementary bolometric detectors being formed of a bolometric membrane including a film made of vanadium oxide VOx, having (Continued)

a resistivity in the range from 6 ohm·cm to 50 ohm·cm, said membrane being suspended above a substrate integrating a signal for reading out the signal generated by said elementary detectors and for sequentially addressing the elementary detectors. The detector includes at least one getter intended to ensure the trapping of residual gas during and after the forming of the detector, and includes a hermetically-sealed cavity having said array and said at least one getter housed therein, having an upper cap including a window transparent to infrared radiation, said cap being sealed by means of a seal on a chip supporting the array of elementary detectors or on a package at the bottom of which the chip supporting the array of elementary detectors has been attached, said cavity being under vacuum or a low pressure.

7 Claims, 3 Drawing Sheets

(58) Field of Classification Search
CPC ..... H01L 27/14621; B32B 3/10; B32B 15/04; B81B 7/0067; B81B 7/0048; B81B 2201/0207
See application file for complete search history.

(56) References Cited

U.S. PATENT DOCUMENTS

| | | | |
|---|---|---|---|
| 6,313,463 B1 | 11/2001 | Cole et al. | |
| 8,153,980 B1* | 4/2012 | Brady | G01J 3/0232 250/338.1 |
| 8,228,159 B1* | 7/2012 | Coffey | H01C 7/006 338/22 R |
| 8,329,002 B1* | 12/2012 | Githinji | C23C 14/0042 204/192.21 |
| 9,570,321 B1* | 2/2017 | Black | H01L 21/3225 |
| 2005/0176179 A1* | 8/2005 | Ikushima | H01L 37/00 438/125 |
| 2006/0131501 A1 | 6/2006 | Ikushima et al. | |
| 2007/0029484 A1* | 2/2007 | Anderson | H04N 5/3655 250/338.1 |
| 2013/0334635 A1* | 12/2013 | Kennedy | G01J 5/045 257/431 |
| 2016/0097681 A1* | 4/2016 | Buchan | G01J 5/045 250/338.4 |

OTHER PUBLICATIONS

Smith "Vanadium Oxide Microbolometer with Patterned Gold Black or Plasmonic Resonant Absorbers", Fall 2015, p. 1-151 (Year: 2015).*

International Search Report issued in PCT Patent Application No. PCT/EP2017/084824 dated Apr. 10, 2018.

Cole et al., "Integrated vacuum packaging for low-cost lightweight uncooled microbolometer arrays," *Proceedings Optical Diagnostics of Living Cells II*, vol. 4369 (2001).

International Preliminary Examination Report issued in PCT Patent Application No. PCT/EP2017/084824 dated Apr. 16, 2019.

Garcia-Blanco et al., abstract for "Low-temperature vacuum hermetic wafer-level package for uncooled microbolometer FPAs," *SPIE*, vol. 6884 (2008).

Garcia-Blanco et al., "Hybrid wafer-level vacuum hermetic micropackaging technology for MOEMs-MEMs," *SPIE*, vol. 7208 (2009).

Podraza et al., abstract for "Electrical and optical properties of sputtered amorphous vanadium oxide thin films," *Journal of Applied Physics 111*, No. 7 (2012).

Motyka et al., abstract for "Microstructural evolution of thin film vanadium oxide prepared by pulsed-direct current magnetron sputtering," *Journal of Applied Physics 112*, No. 9 (2012).

Voshell et al., "Materials for microbolometers: vanadium oxide or silicon derivatives," Proc. of SPIE vol. 10209 (2017).

Basantani, H.A. et al., "Enhanced electrical and noise properties of nanocomposite vanadium oxide thin films by reactive pulsed-dc magnetron sputtering," Appl. Phys. Lett, 100, 262108 (2012).

* cited by examiner

DETECTOR OF ELECTROMAGNETIC RADIATION AND IN PARTICULAR INFRARED RADIATION, AND PROCESS FOR PRODUCING SAID DETECTOR

TECHNOLOGICAL FIELD

The present disclosure relates to infrared imaging. More particularly, the present disclosure relates to the manufacturing of detectors of electromagnetic radiation, and particularly infrared radiation, integrating bolometric detectors.

BACKGROUND

In the field of infrared detectors, it is known to use devices arranged in an array and capable of operating at ambient temperature, that is, requiring no cooling at very low temperature, conversely to imaging devices called "quantum detectors", which require an operation at very low temperature, typically that of liquid nitrogen.

Such uncooled detectors conventionally use the variation of a physical quantity of an appropriate material, according to temperature, in the vicinity of 300 K. In the case of bolometric detectors, the physical quantity is electric resistivity.

Such an uncooled detector generally associates:

means for absorbing the infrared radiation and for converting it into heat, means for thermally isolating the detector, to enable it to heat up under the action of the infrared radiation, thermometry means which, in the context of a bolometric detector, use a resistive element formed from electrodes and from an element of sensitive material called "thermistor", and means for reading out the electric signals supplied by the thermometry means.

The infrared radiation absorption and thermometry means are integrated in a membrane suspended by the thermal insulation means above a substrate, where the readout means, and particularly, a readout integrated circuit ROIC, are arranged. The thermal insulation means are typically formed of narrow beams, currently called "arms", clamped on electrically-conductive pillars.

Detectors are conventionally manufactured in the form of a one- or two-dimensional array of elementary detectors, said array being formed in so-called monolithic form, or transferred onto the substrate, the latter being generally formed in CMOS ("Complementary Metal Oxide Semiconductor") on silicon technology, and having means for sequentially addressing the elementary detectors, and means for electrically exciting and for preprocessing the electric signals formed from the elementary detectors, formed therein.

The assembly is placed in a hermetically-sealed chamber, typically, a package under very low pressure, to make the thermal conductance of the surrounding gas totally negligible. To obtain a scene via this type of detectors, said scene is projected through an adapted optical system on the array of elementary detectors, and clocked electric stimuli are applied via the readout circuit to each of the elementary detectors, or to each row of such detectors, capable of generating an electric signal forming the image of the temperature reached by each of the elementary detectors.

This signal is more or less elaborately processed by the readout circuit, and then possibly by an electronic device external to the package, to generate the thermal image of the observed scene.

One of the key elements of this type of detectors thus lies in the thermometry means, typically formed of a surface element defined in a thin film, as well as in the structure of each microdetector (or pixel), to transform any temperature variation into a variation of the electric current that it conducts.

Thus, the electric resistance of a microdetector $R_b$ can be expressed according to resistivity $\rho$ of the thermistor material by relation:

$$Rb = \rho * \frac{L}{w*e} \quad (1)$$

where L, w and e respectively designate the length, the width, and the thickness of the element (generally parallelepipedal) of thermistor material conducting the electric current.

Response $\Re$ (V/K) of said microdetector of resistance Rb biased under a constant voltage $V_{pol}$ expresses the output signal variation $\delta S$ in relation with a scene temperature variation $\delta T_{SC}$, according to the following general relation:

$$\Re = \frac{\partial S}{\partial T_{sc}} = \frac{V_{pol}}{Rb} A * \varepsilon * TCR * R_{th} * \frac{(P_{T2} - P_{T1})}{(T2-T1)} * \frac{T_{int}}{C_{int}} \quad (2)$$

where:

A is the total area of the elementary sensitive point (detector pixel), $\varepsilon$ is the general optical absorption efficiency of the bolometer, TCR (acronym for "Temperature Coefficient of Resistance") is representative of a coefficient of variation of the resistivity of the material forming the sensitive portion of the bolometer close to the operating temperature, $R_{th}$ is the thermal resistance between the membrane and the substrate (that is, of the holding arms), $P_{T1}$ is the incident radiation power originating from the scene at temperature T1, integrated over the spectrum (typically 8-14 µm, that is, the far infrared band or LWIR) and within a solid angle characterized by the optical system used.

$P_{T2}$ is the equivalent of $P_{T1}$ for a scene temperature T2 greater than T1.

Tint is the duration of integration of the current flowing through the microdetector, through a capacitance Cint which characterizes the analog amplifier (or CTIA for "Trans Impedance Amplifier") of the readout circuit.

Relations (1) and (2) show that the response of each microdetector is directly linked to the intrinsic properties of the "thermistor" material, that is, its resistivity $\rho$ and its TCR. It should be noted that the two parameters are interdependent.

It is thus necessary to select the TCR-☐ pair adapted to the technological constraints associated with the manufacturing, and to the targeted performance. Maintaining these parameters all along the technological integration is determining to obtain performances and efficiencies compatible with industrial requirements.

Among the thermistor materials used, amorphous silicon and vanadium oxides (VOx) can be mainly distinguished. The latter are known to generally have a very disordered or even amorphous structure (see for example, Bryan D. Gauntt's thesis "*The nano-composite nature of Vanadium* oxide thin-films for use in Infrared Microbolometers"—May 2011). By definition, such materials are not at the thermodynamic equilibrium and are likely to varying under the effect of the thermal stress involved. VOx materials are particularly relevant in the general context of bolometric detectors, due to an adjustable resistivity, a high TCR coefficient, and a low noise level.

Thus, a TCR value greater than or equal to 2% is typically accessible if the resistivity of the VOx is above 0.1 ohm·cm measured at 30° C. For resistivities set below this threshold, the low value of the TCR no longer enables to guarantee the detector characteristics at a sufficient level.

Further, high resistivities adversely affect response $\Re$ of the microdetectors by causing a rise in their electric resistance Rb. To define a value of maximum resistivity beyond which the response of a microdetector would become too low, a numerical application of equation (2) may be performed. Response $\Re$ reflects the deviation of the signal delivered by the detector for a 1-degree contrast observed on the scene. To generate an image of good quality, response $\Re$ is typically in a range from 5 to 15 mV/degree.

Considering that a value of 2 mV/degree is a minimum below which the image would be very degraded by lack of contrast, and thus made unexploitable, equation (2) enables to determine maximum resistance Rb, and to deduce therefrom the associated resistivity with equation (1), considering a square thermistor (w=L) having a 200-nanometer thickness.

Apart from the industrial issues induced by the thick film deposition, the suspended mass limits the detector rapidity. A thermistor having a thickness greater than 200 nanometers would not enable to obtain a thermal time constant smaller than approximately 15 ms, which is a typically maximum value in the field.

The value of the incident powers may be calculated according to Planck's law. Considering that the scene is seen by the detector provided with a typical window essentially transparent in the LWIR band and opaque for any other wavelength, through a port of diameter □ placed at a distance d=□ from the focal plane, the powers received, for example, for scene temperatures respectively of 20° C. and 35° C. are:

$P_{T1=20°\ C.}=38.66\ W/m^2$ $P_{T2=35°\ C.}=48.56\ W/m^2$

In this example, the detector pixel has a surface area of 17 µm×17 µm, a thermal resistance of $100^E6$ K/W and a 80% absorption efficiency; it is provided with a square thermistor having a 200-nm thickness and a 2% TCR and biased with Vpol=2V.

The analog amplifier has to fulfill various constraints, that is, a 50-µs value of Tint compatible with an operation of the imager at 50 Hertz, in "rolling shutter" mode, that is, with a sequential reading of the rows, and a relatively high capacitance Cint, that is, 6 pF to minimize dispersions and the electronic noise resulting from the integration of the current.

The insertion of these parameters into equation (2) enables to conclude that a resistor Rb of $2.5^E6$ Ohm results in a response of 2 mV/degree.

The corresponding resistivity is thus close to 50 Ohm·cm, which value can then be considered as an upper limit.

Thin films of vanadium oxide VOx are deposited on a substrate, typically by PVD ("Physical Vapor Deposition") techniques. According to this technique, a target of vanadium or of a compound containing vanadium is placed in vacuum and bombarded by the atoms of an ionized neutral gas, typically argon or krypton.

When this process takes place in the presence of oxygen or of another oxidizing gas, introduced into the reactor in controlled fashion, the vanadium atoms extracted from the target under the action of the ion bombarding react with oxygen to form a VOx layer on the substrate placed substantially opposite said target.

It has been shown (according for example to Bryan D. GAUNTT's thesis "The nano-composite nature of Vanadium oxide thin films for use in Infrared Microbolometers"—May 2011) that the resistivity of the obtained VOx film depends on the value of x, the latter depending, at the first order, on the partial pressure of oxygen in the reactor.

To obtain an exploitable response of the bolometric detector, it is necessary to provide a maximum thermal insulation between the sensitive structure of the bolometer, and particularly the suspended membrane, and its environment. To guarantee this condition, the microstructures are placed in an atmosphere at very low pressure, typically close to $10^{-3}$ mbar.

In practice, a window transparent in infrared, typically made of silicon or of germanium, is sealed on the top of a hollowed package, at the bottom of which the chip-detector is previously attached, or directly sealed to the actual chip in the case of a collective process of "Wafer Level Packaging" type.

Whatever method is implemented, the two parts are attached to each other by means of a metal seal (or solder) which is locally melted, and which provides a tightness compatible with the detector operation and durable in time.

However, and due to degassing phenomena which occur during or after the sealing, to guarantee that the initial low pressure level is maintained in the package all along the detector lifetime, despite the surface degassing of the inner elements of the package, it is known to integrate in said package a gas trapping device called "getter", which absorbs residual gas molecules. Such "getter" materials are conventionally made of a metal alloy, which becomes highly reactive beyond a temperature threshold called activation temperature.

Such vacuum encapsulation constraints, and particularly the sealing operation and the getter activation, result in the need for a thermal treatment capable of altering the performances of the actual detector due to the evolution of the properties and characteristics of the thermistor material.

For example, the selection of a eutectic Au/Sn alloy (80/20) typical as a metal seal enables to limit such thermal stress due to a low melting point, in the case in point around 280° C. With this type of alloy, a sealing performed at a temperature close to 300° C. thus enables to obtain a reliable seal, capable of guaranteeing a sufficient robustness to withstand subsequent methods of integration in a more complex system.

As a corollary, the getter activation is dependent on the materials forming it. It generally occurs at relatively high temperature. However, specific optimized alloys enable to lower the activation threshold of such getter materials down to around 300° C., while guaranteeing a good gas pumping or getter capacity (example: SAES's "Pagewafer" product).

The seal forming and getter activation steps are generally, and for economical reasons, treated simultaneously during a single thermal cycle which accordingly submits the detector chip to a temperature higher than or equal to 300° C. Document WO2016/09126 describes such a method. It is generally necessary to hold this temperature for at least 10 minutes, and possibly up to 90 minutes, for example, if required by the getter activation.

This procedure defines an order of magnitude for the minimum thermal budget, compatible with industrial constraints, while providing an excellent stability of the vacuum level all along the detector lifetime.

However, the use of disordered VOx thermistor materials, that is, outside the thermo-dynamic equilibrium, via a manufacturing method in this temperature range may generate variation of the intrinsic electric properties thereof (□ and TCR), which rule the sensitivity of the detectors and the quality of the detected signal.

Indeed, the pixels of an array detector are "read" by an electronic readout device calibrated to deliver a signal for each pixel, and which directly reflects the resistance value thereof. The electronic readout circuit may read resistance values in a range determined by its electric dynamic range, defined by the minimum and maximum output voltage values of an analog amplifier.

Thus, to be able to use such a dynamic range to measure resistance variations generated by the capture of the infrared radiation, it is necessary to minimize the initial dispersion of the pixels of the detector array. This requires a perfect uniformity of the thermistor material across the entire surface of the array detector.

Although PVD-type deposition methods implemented to form VOx films result in very good spatial uniformities, the forming of an array detector integrating such thermistor materials submitted to the vacuum sealing process, such as previously described, that is, in a temperature range typically close to 300° C., may affect in significant or even crippling fashion the uniformity of the output signal, and thus, as a corollary, the performance of such a detector.

Indeed, for industrial optimization and capacity purposes, the thermal sealing cycles are preferably short and carried out in high vacuum ovens, which condition adversely affects the thermal homogenization and the heat transfer from the oven to the parts.

Since the thermal stress is thus non-uniform and the VOx thermistor material conventionally implemented in the prior state of the art, that is, with a resistivity set within a range from 0.1 to 1 ohm·cm measured at 30° C., is sensitive to the temperature locally reached, this process inevitably results in an increased dispersion of the resistance values of the microdetectors on the array detector, resulting in a spreading of the output signal distribution in the readout circuit dynamic range, which alters in almost crippling fashion, at least in terms of production statistics, the dispersion of said output signal and the resulting image. In other words, the non-uniform evolution of the thermistor material resulting from the application of a non-homogeneous thermal process to a material which is unstable in the considered temperature range (and typically 280-320° C.) deteriorates the uniformity of the array detector in crippling fashion.

As an example, if all the pixels of an array detector having resistances with a 1% initial dispersion evolve in non-homogeneous fashion during the vacuum sealing, to finally exhibit a 3% dispersion, the pixel population which was initially concentrated at the center of the readout circuit dynamic range is distributed over almost the entire readout dynamic range (see FIG. 3—lower portion).

It has been shown (see for example S. GARCIA-BLANCO et al "*Low temperature vacuum hermetic wafer-level package for uncooled microbolometer FPAs*"—SPIE Vol. 6884-2008, or also S. GARCIA-BLANCO et al "*Hybrid wafer-level vacuum hermetic micropackaging technology for MOEMS-MEMS*"—SPIE Vol. 7208-2009) that usual packaging processes implementing a sealing temperature higher than 300° C. raise an issue with vanadium oxides VOx as a thermistor material, and a sealing temperature for such materials in the range from 150 to 200° C. is suggested. It can however be observed that with such sealing temperatures, the use of an efficient getter is impossible with current technologies, which results in a fast degradation of the vacuum level in the package.

In other words, there is a real difficulty in the forming of such array detectors at an industrial scale, which is due to thermal budget constraints and to the durability of the properties of these detectors in terms of quality of the detected images. In other words, no simple means to form array detectors of the type in question, enabling to manage dispersions without adversely affecting the industrial benefit and its budget constraints, are known.

SUMMARY OF THE DISCLOSURE

The disclosed embodiments basically aim at overcoming this difficulty with a simple solution which requires no adaptation of current detector packaging processes, nor any electronic dispersion correction system, and which then perfectly adapts to industrial processes for forming such detectors.

The invention first comprises using as a thermistor material a film of vanadium oxide VOx having a resistivity much greater than that described in prior art, and typically in the range from 6 to 50 ohm·cm, and advantageously from 6 to 24 ohm·cm, measured at 30° C.

For this purpose, it comprises forming by PVD, and for example, by ion beam sputtering (IBS) of a vanadium target, a film of vanadium oxide VOx, under a controlled partial $O_2$ pressure, with no heat input during the growth of the oxide layer on a substrate formed of a single-crystal silicon wafer, by varying x between approximately 1.8 and 2.3, which corresponds to resistivity values of 6 ohm·cm and 50 ohm·cm, respectively, measured at 30° C. (the match between the resistivity and a composition x is particularly established in Bryan D. GAUNTT's previously-mentioned thesis).

By means of such a material, the Applicants have shown that in the range of temperatures of integration, and thus of closing (sealing) of the package and of getter activation, that is, typically in the range from 280 to 320° C., the resistivity variation of the thermistor material used remains very contained, conversely to materials used in prior art, such a stability providing a satisfactory uniformity of the resulting signal at the readout circuit level.

Thus, the disclosed embodiments aim at an infrared radiation detector comprising:

an array of elementary imaging bolometric detectors, each of the elementary bolometric detectors being formed of a bolometric membrane comprising a film made of amorphous vanadium oxide VOx, having a resistivity in the range from 6 ohm·cm to 50 ohm·cm, and advantageously from 6 ohm·cm to 24 ohm·cm, said membrane being suspended above a substrate integrating a signal for reading out the signal generated by said elementary detectors and for sequentially addressing the elementary detectors, at least one getter intended to trap the residual gas during and after the forming of the detector;

a hermetically-sealed cavity having said array and said getter, housed therein, which cavity has its upper cap comprising a window transparent to infrared radiation, said cap being sealed to a chip supporting the array of elementary detectors or to a package at the bottom of which the chip supporting the array of elementary detectors has been attached, said cavity being under vacuum or a low pressure.

The disclosed embodiments also relate to a method of forming such an infrared radiation detector. The method essentially comprises simultaneously performing the sealing of the upper cap of the package, after elementary detectors have been installed therein, having its thermistor material formed of a film of vanadium oxide VOx having a resistivity in the range from 6 ohm·cm to 50 ohm·cm, and advantageously from 6 ohm·cm to 24 ohm·cm measured at 30° C., and the getter activation at a temperature in the range from 280° C. to 320° C.

According to an embodiment, the film made of vanadium oxide VOx used to form the bolometric membrane has a resistivity in the range from 6 ohm·cm to 9 ohm·cm measured at 30° C., and the sealing of the upper cap of the cavity thereon, after the elementary detectors and the getter have been installed therein, is carried out at a temperature in the range from 280° C. to 300° C. for a time period in the range from 10 to 90 minutes.

According to another embodiment, the film made of vanadium oxide VOx used to form the bolometric membrane has a resistivity in the range from 9 ohm·cm to 24 ohm·cm measured at 30° C., and the sealing of the upper cap of the cavity thereon, after the elementary detectors and the getter have been installed therein, is carried out at a temperature in the range from 280° C. to 320° C. for a time period in the range from 10 to 90 minutes.

Thereby, the performance of such a detector in terms of quality of the acquired thermal image is combined with the economical constraints inherent to the manufacturing thereof, while further ensuring an increased lifetime of the detector.

BRIEF DESCRIPTION OF THE DRAWINGS

The foregoing features and advantages of the presently disclosed embodiments will now be discussed in the following non-limiting description of a specific embodiment, in relation with the accompanying drawings.

DETAILED DESCRIPTION

Figure 1:
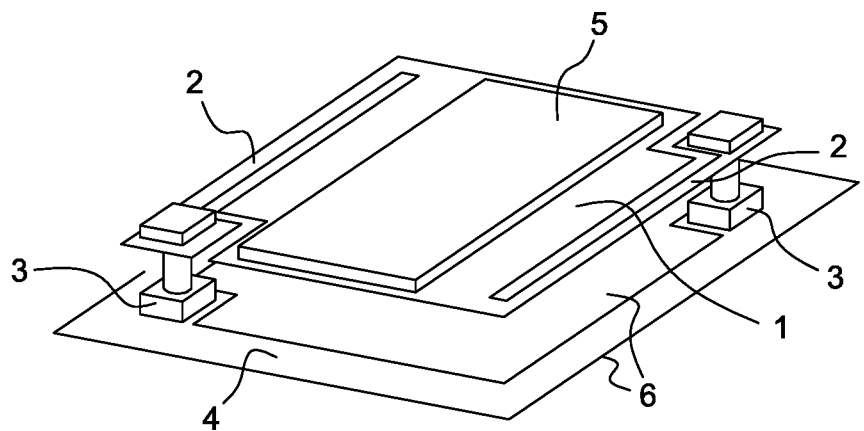
FIG. 1 is a simplified representation of a bolometric pixel or elementary bolometric detector.

An elementary bolometric detector has been shown in FIG. 1. Such a detector is basically formed of a membrane (1) suspended via thermal insulation "arms" (2) and pillars (3), ensuring the electric connection with the substrate (4).

The membrane (1) comprises a thin film of thermistor material (5) on the most part of its surface, oriented opposite a window transparent to infrared radiation (and typically made of silicon or of germanium).

Advantageously, and to optimize the performance of the elementary detector, a metallic reflector film (6) is affixed under the suspended membrane and at an adequate distance therefrom, to form a resonating cavity and thus optimize the absorption of the infrared radiation.

The thermistor material (5) is made of a thin film of vanadium oxide VOx, having a typically thickness in the range from 20 to 200 nanometers and having a resistivity in the range from 6 ohm·cm to 50 ohm·cm. These resistivity values typically correspond to a value of x in the range from 1.8 to 2.3, such as measured by the RBS (acronym for "Rutherford Backscattering Spectroscopy") technique.

The thin film of vanadium oxide VOx is formed by IBS (acronym for "Ion Beam Sputtering") deposition on a substrate at ambient temperature in a reactor in the presence of oxygen, with a partial pressure in the range from $3\times10^{-5}$ Torr to $1\times10^{-4}$ Torr.

Figure 2:
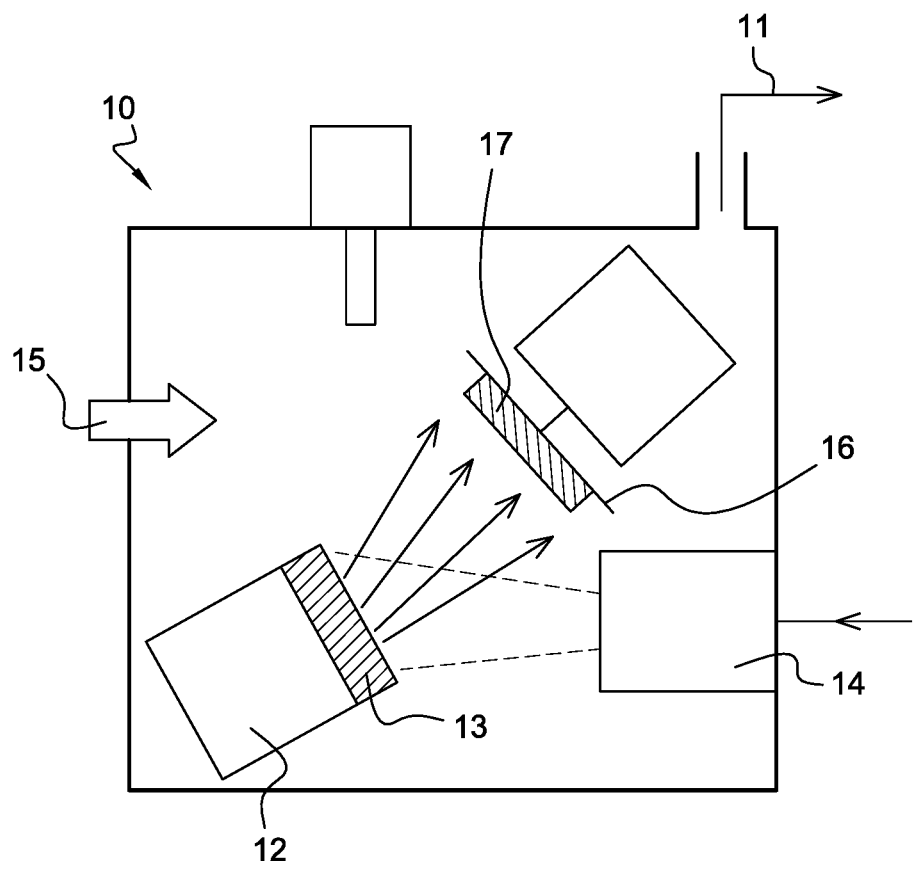
FIG. 2 is a simplified representation illustrating the principle of the forming of a vanadium oxide film by IBS (acronym for "Ion Beam Sputtering"), which is the preferred technique in the state of the art.

Such a reactor is illustrated in FIG. 2. This reactor (10), provided with a pumping system (11), comprises a support (12) receiving a target (13) of pure or almost pure vanadium. The target is bombarded by a beam of ionized krypton emitted by a gun (14) known per se. The use of krypton is not limiting, any other rare gas may be used.

The vanadium atoms ejected from the target as a result of this ion bombarding are more or less oxidized by the oxygen (15) introduced into the reactor. The partial pressure of oxygen present in the reactor chamber is controlled by means of a regulation loop to set the final quantity x to the desired value. The sputtered vanadium atoms oxidize to form on a substrate (16) a layer of VOx having a resistivity depending on proportion x of atomic oxygen.

The substrate (16) is kept at a temperature close to the room temperature during the deposition by a cooling system (not shown) using a heat-carrying fluid.

To compare the thermal stability of VOx having an initial resistivity measured at 30° C. in the range from 0.5 to 24 ohm·cm, the selected substrate is formed of a film of silicon nitride SiNx (or even of silicon oxide SiOx) deposited on a 200-millimeter wafer of single-crystal silicon. This provides an excellent electric insulation between the VOx film and the silicon substrate.

A series of square patterns ("Van der Pauw"-type patterns) is then defined by photo-lithography and then etching of the VOx material. The material is then contacted at the four corners of this square by the deposition and then the definition of metal electrodes.

The assembly is then encapsulated by a layer of silicon nitride SiNx deposited by PECVD (acronym for "Plasma-Enhanced Chemical Vapor Deposition") at low temperature, that is, 280° C., to preserve the characteristics of the VOx material. The encapsulation is carried out so as to entirely cover the VOx patterns, to insulate the VOx material from any chemical interaction with the ambient atmosphere during anneal tests.

The patterns are then biased via the metal electrodes. The resistance per square of the VOx film is then determined by the Van der Pauw method. The thickness of the VOx films is determined by ellipsometry on dedicated neighboring patterns. The thickness and the resistance per square of such films define their resistivity. This method has been applied before and after each anneal. The results appear on the graph of FIG. 4 for 90-minute anneals. It has been previously verified that the silicon nitride encapsulation layer has not modified the properties of the VOx film.

Five wafers each integrating a VOx film, of respective resistivities of 0.5 ohm·cm, 6.3 ohm·cm, 9.3 ohm·cm, 20 ohm·cm, and 24 ohm·cm measured at 30° C. have thus been formed. Such resistivities are correlated to the respective value of x (to within + or −0.1) of 1.6; 1.8; 1.9; 2, and 2.1.

Samples from these wafers have then been submitted to anneals performed under a nitrogen flow and at different temperatures, staged between 240° C. and 330° C., to assess their thermal stability, or in other words their robustness in the presence of thermal stress. To deliberately be in the configuration which is the most constraining for the material, but the safest in terms of industrial reliability, particularly in terms of stability of the vacuum of the sealed components, the anneal time has been set to 90 minutes.

Figure 4:
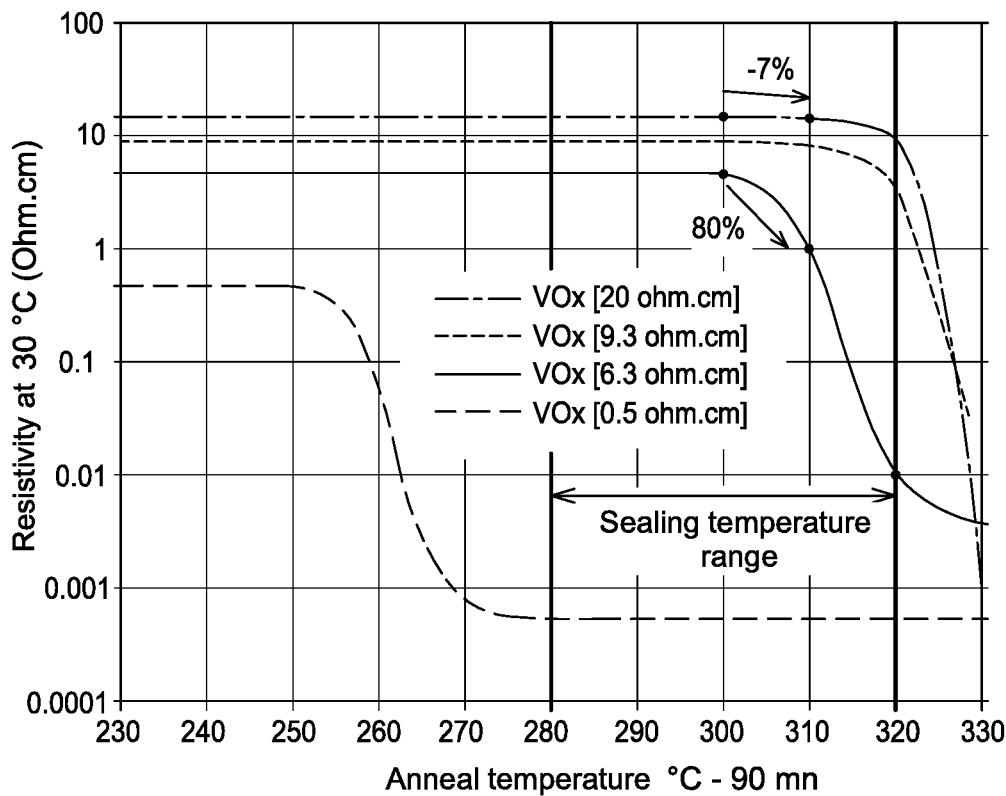
FIGS. 4 and 5 are graphs representative of the variation of the resistivity of films of vanadium oxide VOx, for different intrinsic resistivities measured at 30° C., according to the anneal temperature, respectively for anneal durations of 90 and of 10 minutes.

The following observations can then be drawn from the curves of FIG. 4.

The film having a 0.5-ohm·cm initial resistivity sees its resistivity significantly drop as soon as the temperature reaches 250° C.

The film having a 6.3-ohm·cm initial resistivity is stable up to 300° C. and then sees its resistivity abruptly drop.

However, the films having an initial resistivity of 9.3, 20, and 24 ohm·cm have but a very small variation in terms of resistivity up to 310° C., said resistivity only dropping from 320° C.

The stability threshold of the material thus appears to depend on its composition and on its intrinsic resistivity; the materials having the highest resistivities being the most stable.

Such measurements have also been carried out on identical samples, but for anneals of short duration, typically 10 minutes, corresponding to a realistic minimum time for a vacuum sealing process.

Thus, other devices integrating the same films of respective initial resistivities measured at 30° C. of 0.5 ohm·cm, 6.3 ohm·cm, and 20 ohm·cm have been submitted to 10-minute anneals under a nitrogen flow, at different temperatures covering the range of interest, that is, 280° C., 300° C., 310° C., 320° C., and 330° C.

Figure 5:
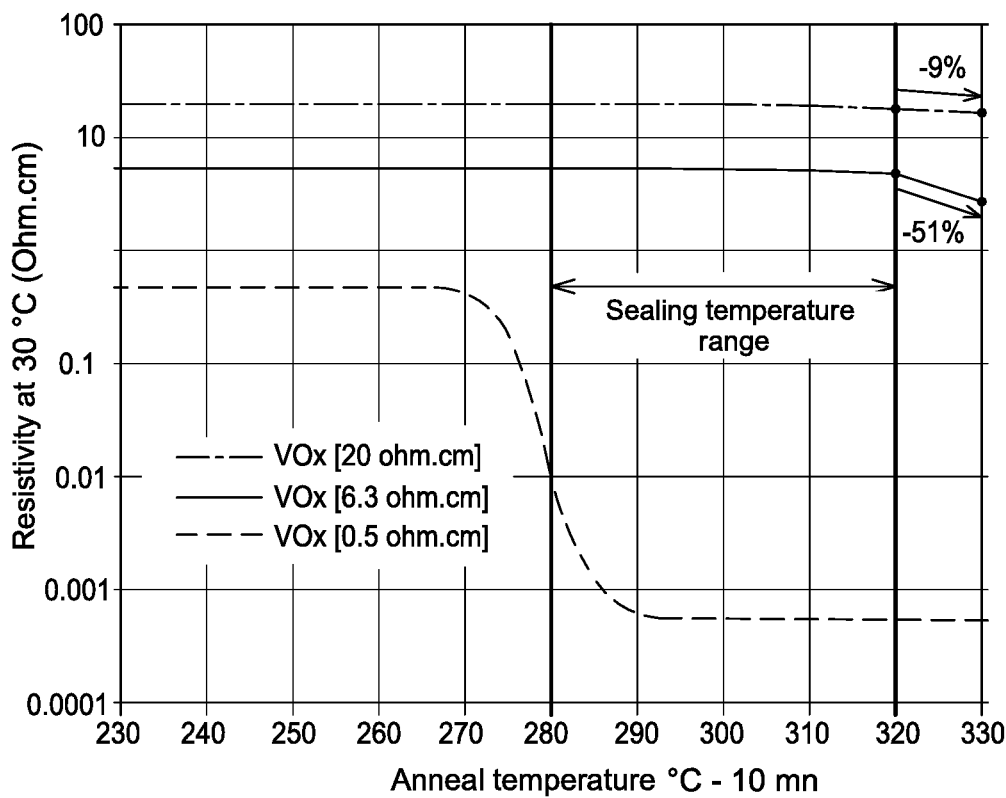

The resistivity value measured after the anneal for each sample, plotted on the graph of FIG. 5, results in the following observations:

The film having an initial resistivity of 0.5 ohm·cm has not resisted the 280° C. anneal despite an anneal duration decreased to 10 minutes. This observation implies the incompatibility of such a material representative of the state of the art with the vacuum sealing process considered herein.

The film having a 6.3-ohm·cm initial resistivity keeps stable characteristics up to 320° C. at least for this short-time anneal (10 minutes).

The film having an initial resistivity of 20 ohm·cm withstands a 10-minute anneal up to 330° C.

Thereby, by using elementary detectors integrating, as a thermistor material, vanadium oxide VOx, x being in the range from 1.8 to 2.3, characterized by a resistivity measured as previously indicated, that is, in the range from 6 ohm·cm to 50 ohm·cm at 30° C., it becomes possible to form infrared array detectors having high and lasting performances, despite the step of sealing the upper cap to the package and of getter activation, which as already indicated, is capable of occurring at at least 300° C. as soon as an appropriate metal seal (for example, of AuSn (80/20) type) and a getter material (for example, of the type commercialized by SAES under reference "Pagewafer") are selected, at a relatively low activation temperature.

Figure 3:
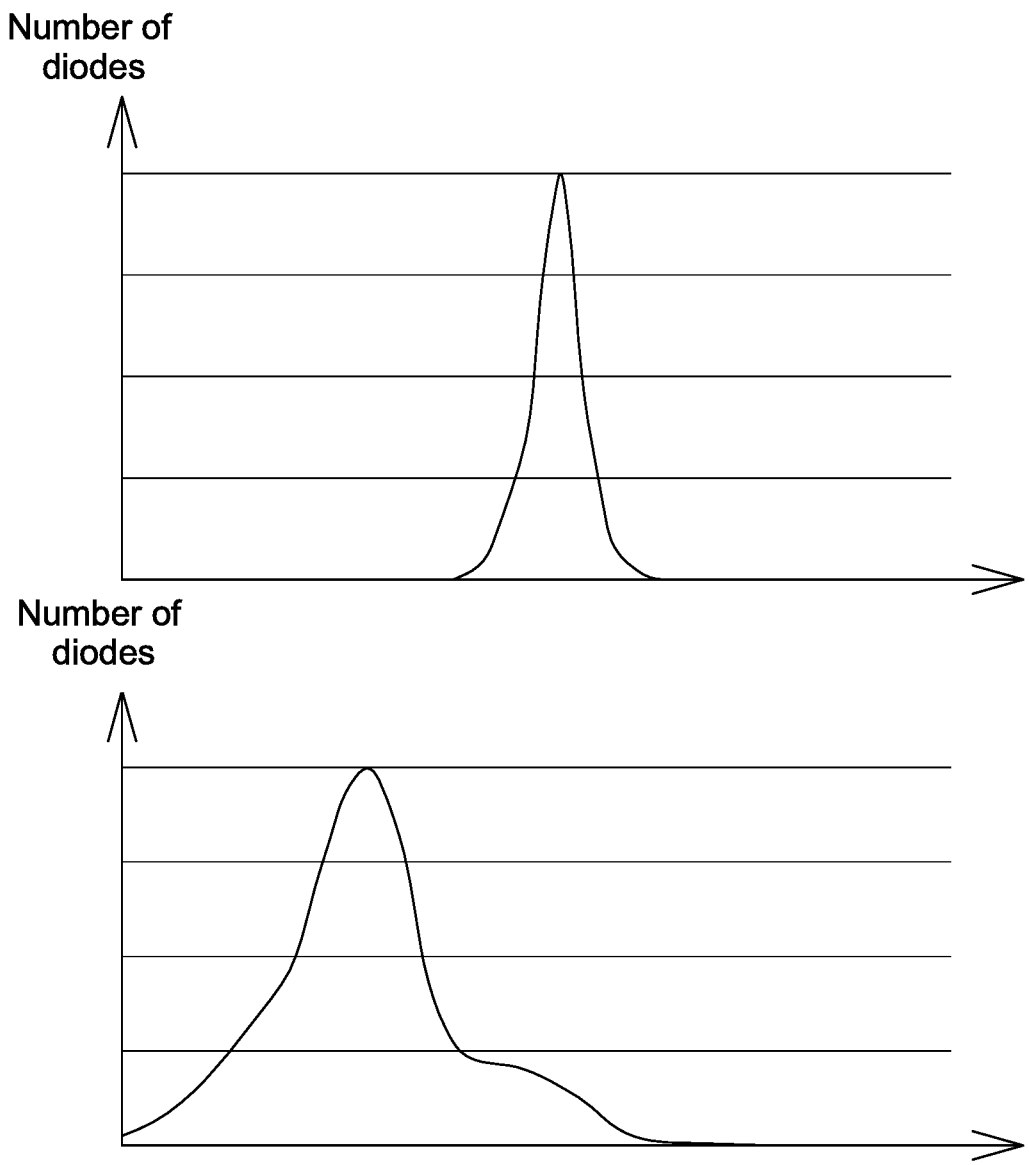
FIG. 3 shows two histograms showing the dispersion of the output signal of an array infrared radiation detector, respectively: for the case of a material which has not evolved during its integration into the detector (upper portion), and for the prior art case of a VOx material (lower portion) deteriorated by the thermal treatment.

The thermal stability of such thermistor materials in terms of resistivity results in a limited dispersion of the signal obtained at the output of the readout circuit, and enables to keep at the output of the analog amplifier a narrow distribution histogram contained at the center of the electric dynamic range, as illustrated in FIG. 3 (upper portion).

A film of intermediate initial resistivity (measured at 30° C.), typically smaller than 6 ohm·cm, is unstable in the considered temperature range, which results in a very widened histogram which now occupies the most part of the electric dynamic range (FIG. 3—lower portion). Such a material would require, if the high reliability level of the previously-indicated sealing method is desired to be kept, complex electronic correction systems to take each output signal of the pixels to the center of the readout circuit dynamic range.

The film having the lowest electric resistivity, 0.5 ohm·cm, undergoes such an evolution in the applied temperature range that it should be considered incompatible with this sealing technology. Its TCR is zero or too low, and accordingly of no interest. Such a material would require using low-temperature sealing alloys, which do not enable to use efficient getters, which jeopardizes the durability of the vacuum and thus the reliability of the components formed by this method.

The Applicants have also observed that a VOx film having a resistivity close to 1 ohm·cm has faster degradation kinetics under an ordinary atmosphere than VOx films described in the present disclosure.

Indeed, it has been described (see for example N. J. Podraza et al. —"*Electrical and optical properties of sputtered amorphous vanadium oxide thin films*"—Journal of Applied physics 111 n° 7—Apr. 1, 2012, or also M. A. Motyka et al. —"*Microstructural evolution of thin film vanadium oxide prepared by pulsed-direct current magnetron sputtering*"—Journal of Applied Physics 112, no 9 (2012)) that a layer of lower density (often called "roughness layer") forms at the surface of VOx films exposed to ambient air. Measurements by ellipsometry interpreted by multilayer models, that is, models which consider, as a minimum, the film as being formed of two layers, one being integral, that is, made at 100% of VOx, and the other being made of 50% of VOx and 50% of air (according to the "Bruggeman effective medium approximation") enable to determine the thickness of this "roughness layer". The follow-up of the thickness of this layer along time, for an exposure to air and in the same temperature and humidity conditions, shows growth kinetics approximately twice faster in the case of a 1-ohm·cm VOx film than for a 10-ohm·cm film.

As an example, 40 days after the deposition of the VOx films, which have a total thickness of 80 nanometers, the thickness of the roughness layer remains smaller than 5 nanometers for a VOx film having a 10-ohm·cm resistivity but however exceeds 10 nanometers for a VOx film having a 1-ohm·cm resistivity.

This growth occurs to the detriment of the integral VOx layer. It has been shown (for example, in the two previously-mentioned publications) that this surface layer has a higher resistivity than the integral film, which necessarily modifies the resistance per square of films along time.

Further, the presence of such a surface layer, of low density and of variable thickness, may cause problems of variability of the photolithography and etch methods, necessary to define the VOx patterns. These two difficulties are likely to deteriorate the final detector performances, either by increasing the electric resistance of the pixels beyond the desired value, or by increasing the dispersion of these values. It is however, possible to do away with an in-situ encapsulation after deposition, that is, with no contact with air, of the VOx films, such as advocated in literature (see U.S. Pat. No. 6,313,463), as soon as the thermistor films are used.

The disclosed embodiments result in the possibility of making compatible the performance requirements of uncooled array-type infrared detectors and the constraints of the industrialization of the manufacturing of such detectors.

Further, such detectors are easier to handle, during their manufacturing process, due to their greater capacity of resisting oxidation in ambient air.

The invention claimed is:

1. An infrared radiation detector comprising:

an array of elementary imaging bolometric detectors, at least one getter intended to ensure the trapping of residual gas during and after the forming of the detector;

a hermetically-sealed cavity having said array and said at least one getter housed therein, which cavity has an upper cap comprising a window transparent to infrared radiation;

in which:

each of the elementary bolometric detectors is formed of a bolometric membrane comprising a film made of amorphous vanadium oxide $VO_x$, x being comprised between 1.8 and 2.3, said membrane being suspended above a substrate integrating a signal for reading out the signal generated by said elementary detectors and for sequentially addressing the elementary detectors, said cap is sealed by means of a seal on a chip supporting the array of elementary detectors or on a package at the bottom of which the chip supporting the array of elementary detectors has been attached, said cavity being under vacuum or a low pressure.

2. The infrared radiation detector of claim 1, wherein the seal is made of a AuSn metal alloy.

3. A method of forming an infrared radiation detector, comprising the steps of:

installing an array of elementary imaging bolometric detectors and at least one getter intended to ensure the trapping of residual gas during and after the forming of the detector in said cavity, each of the elementary bolometric detectors being formed of a bolometric membrane comprising a film made of amorphous vanadium oxide $VO_x$, x being comprised between 1.8 and 2.3, said membrane being suspended above a substrate integrating a signal for reading out the signal generated by said elementary detectors and for sequentially addressing the elementary detectors, hermetically sealing said cavity with a upper cap comprising a window transparent to infrared radiation by means of a seal on a chip supporting the array of elementary detectors or on a package at the bottom of which the chip supporting the array of elementary detectors has been attached, said cavity being under vacuum or a low pressure;

in which method:

the sealing of the upper cap of the cavity thereon, after the elementary imaging bolometric detectors and the getter have been installed therein, is performed at a temperature in the range from 280° C. to 320° C. for a duration in the range from 10 to 90 minutes;

and the activation of said getter is performed concurrently to the sealing of the upper cap of the cavity.

4. The infrared radiation detector forming method of claim 3, wherein the film made of vanadium oxide $VO_x$ used to form the bolometric membrane has a resistivity measured at 30° C. in the range from 6 ohm·cm to 24 ohm·cm.

5. The infrared radiation detector forming method of claim 4, wherein the film made of vanadium oxide $VO_x$ used to form the bolometric membrane has a resistivity measured at 30° C. in the range from 6 ohm·cm to 9 ohm·cm, and wherein the sealing of the upper cap of the cavity thereon, after the elementary detectors and the getter have been installed therein, is performed at a temperature in the range from 280° C. and 300° for a duration in the range from 10 to 90 minutes.

6. The infrared radiation detector forming method of claim 4, wherein the film made of vanadium oxide $VO_x$ used to form the bolometric membrane has a resistivity measured at 30° C. in the range from 9 ohm·cm to 24 ohm·cm, and wherein the sealing of the upper cap of the cavity thereon, after the elementary detectors and the getter have been installed therein, is performed at a temperature in the range from 280° C. and 320° C. for a duration in the range from 10 to 90 minutes.

7. The infrared radiation detector forming method of claim 3, wherein the seal sealing the upper cap to the cavity is made of AuSn alloy.

* * * * *